(12) United States Patent
Nakajima et al.

(10) Patent No.: US 10,093,077 B2
(45) Date of Patent: Oct. 9, 2018

(54) STEEL SHEET FOR HOT PRESS-FORMING

(71) Applicant: JFE STEEL CORPORATION, Tokyo (JP)

(72) Inventors: Seiji Nakajima, Tokyo (JP); Minako Morimoto, Tokyo (JP); Satoru Ando, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/901,147

(22) PCT Filed: May 13, 2014

(86) PCT No.: PCT/JP2014/002505
§ 371 (c)(1),
(2) Date: Dec. 28, 2015

(87) PCT Pub. No.: WO2014/207982
PCT Pub. Date: Dec. 31, 2014

(65) Prior Publication Data
US 2016/0144600 A1    May 26, 2016

(30) Foreign Application Priority Data
Jun. 25, 2013  (JP) .................................. 2013-132248

(51) Int. Cl.
*B32B 15/18*  (2006.01)
*B32B 15/01*  (2006.01)
(Continued)

(52) U.S. Cl.
CPC ............ *B32B 15/015* (2013.01); *C21D 1/673* (2013.01); *C21D 7/13* (2013.01); *C22C 18/00* (2013.01);
(Continued)

(58) Field of Classification Search
None
See application file for complete search history.

(56) References Cited

U.S. PATENT DOCUMENTS 6,143,422 A  *  11/2000  Nagai ..................... C23C 22/24
                                                  428/223
6,564,604 B2     5/2003   Kefferstein
(Continued)

FOREIGN PATENT DOCUMENTS

EP        2602359          6/2013
EP        2647739         10/2013
(Continued)

OTHER PUBLICATIONS

International Search Report for International Application No. PCT/JP2014/002505 dated Aug. 5, 2014.
(Continued)

*Primary Examiner* — Seth Dumbris
(74) *Attorney, Agent, or Firm* — RatnerPrestia

(57) ABSTRACT

A steel sheet for hot press-forming having a first coating layer on a surface of the steel sheet, containing 60% or more by mass Ni and a remainder composed of Zn and incidental impurities, a coating mass thereof being more than 5 g/m² and 50 g/m² or less per side, and a second coating layer on the first coating layer, containing 10% to 25% by mass Ni and a remainder composed of Zn and incidental impurities, a coating mass thereof being 10 to 90 g/m² per side.

1 Claim, 1 Drawing Sheet

(51) Int. Cl.

| | |
|---|---|
| *C21D 7/13* | (2006.01) |
| *C21D 1/673* | (2006.01) |
| *C25D 5/14* | (2006.01) |
| *C25D 5/50* | (2006.01) |
| *C25D 7/06* | (2006.01) |
| *C22C 18/00* | (2006.01) |
| *C22C 19/03* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/28* | (2006.01) |
| *C22C 38/32* | (2006.01) |
| *C22C 38/60* | (2006.01) |
| *C21D 1/00* | (2006.01) |
| *C25D 3/12* | (2006.01) |
| *C25D 3/56* | (2006.01) |

(52) U.S. Cl.
CPC ............ *C22C 19/03* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C22C 38/60* (2013.01); *C25D 5/14* (2013.01); *C25D 5/50* (2013.01); *C25D 7/0614* (2013.01); *C21D 1/00* (2013.01); *C25D 3/12* (2013.01); *C25D 3/56* (2013.01); *C25D 3/565* (2013.01); *Y10T 428/12799* (2015.01); *Y10T 428/12937* (2015.01); *Y10T 428/12944* (2015.01)

(56) References Cited

U.S. PATENT DOCUMENTS

| | | |
|---|---|---|
| 9,023,488 B2 | 5/2015 | Nakajima |

| | | | |
|---|---|---|---|
| 2004/0058189 A1 | 3/2004 | Hodgens | |
| 2013/0122322 A1 | 5/2013 | Nakajima | |
| 2013/0252017 A1 | 9/2013 | Nakajima | |
| 2013/0333436 A1 | 12/2013 | Nakajima | |
| 2014/0120365 A1* | 5/2014 | Miyoshi | C23C 28/00 428/623 |

FOREIGN PATENT DOCUMENTS

| | | | |
|---|---|---|---|
| EP | 2684985 | 1/2014 | |
| GB | 1490535 | 11/1977 | |
| JP | S59166691 | * 9/1984 | ............ C23C 22/78 |
| JP | 2004115914 | 4/2004 | |
| JP | 3663145 | 6/2005 | |
| JP | 4883240 | 2/2012 | |
| JP | 2012233248 | 11/2012 | |
| WO | 2012018014 | 2/2012 | |
| WO | 2012070482 | 5/2012 | |
| WO | 2012074132 | 6/2012 | |
| WO | 2012121399 | 9/2012 | |

OTHER PUBLICATIONS

Japanese Office Action dated Mar. 8, 2016 for JP 2013-132248.
Extended European Search Report dated Jun. 29, 2016 for European Application No. 14818596.0, 6 pages.
Korean Final Rejection for Korean Application No. 10-2016-7001899, dated Mar. 27, 2017, with Concise Statement of Relevance of Office Action—3 Pages.
Korean Office Action with partial English language translation for Application No. 10-2016-7001899, dated Jul. 13, 2017, 4 pages.
Korean Office Action with Concise Statement of Relevance of Office Action for Korean Application No. 10-2017-7026855, dated Dec. 1, 2017, 3 pages.

* cited by examiner

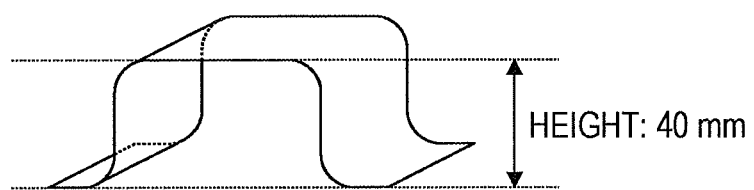

STEEL SHEET FOR HOT PRESS-FORMING

CROSS REFERENCE TO RELATED APPLICATIONS

This is the U.S. National Phase application of PCT/JP2014/002505, filed May 13, 2014, which claims priority to Japanese Patent Application No. 2013-132248, filed Jun. 25, 2013, the disclosures of these applications being incorporated herein by reference in their entireties for all purposes.

TECHNICAL FIELD OF THE INVENTION

The present invention relates to a steel sheet for hot press-forming that is suitable to produce automotive underbody parts and automotive body structural parts by hot press-forming.

BACKGROUND OF THE INVENTION

Most of the automotive underbody parts and the automotive body structural parts are manufactured by press-forming steel sheets having a predetermined strength at a room temperature. In recent years, from the perspective of global environmental conservation, there has been a strong demand for weight reduction of automotive bodies, and efforts have been made to reinforce steel sheets and thereby decrease the thickness of the steel sheets. However, the reinforced steel sheets have lower press-formability, and it is often difficult to press-form the steel sheets into automotive parts having desired shapes.

A technique, called a hot press-forming, is proposed in Patent Literature 1, in which both good press-formability and reinforcement of steel sheets are satisfied by hot press-forming a heated steel sheet with a mold composed of a die and a punch and simultaneously quenching the heated steel sheet. However, in the hot press-forming, the steel sheet is heated to a high temperature of approximately 950° C. before the hot press-forming, and scales (iron oxides) are formed on the surface of the steel sheet. Such scales are peeled off during the hot press-forming and causes a problem of damage to the mold or damage to the surface of hot press-formed parts.

Scales remaining on the surface of the parts also causes poor appearance and poor paint adhesiveness. Thus, the scales on the surface of the parts are generally removed by a treatment such as pickling or shot blasting. However, such a treatment makes the production process complex and decreases productivity.

Automotive underbody parts and automotive body structural parts also require excellent corrosion resistance. However, hot press-formed parts manufactured through such a treatment have no anticorrosion film, such as a coating layer, and have quite insufficient corrosion resistance.

Thus, there is a demand for a hot press-forming technique that can suppress the formation of scales during heating before hot press-forming and improve the corrosion resistance of hot press-formed parts. Therefore, a steel sheet for hot press-forming that has a film, such as a coating layer, on its surface and a hot press-forming method in which such a steel sheet is used are proposed. For example, Patent Literature 2 discloses a method for producing a hot press-formed part excellent in corrosion resistance having Zn—Fe-based or Zn—Fe—Al-based compounds on its surface by hot press-forming a steel sheet coated with Zn or Zn-based alloy.

Patent Literature 3 discloses a steel sheet for hot press-forming that includes a Ni-based coating layer and a Zn—Ni coating layer in this order on its surface. The Ni-based coating layer has a coating mass of 0.01 to 5 $g/m^2$, and the Zn—Ni coating layer has a coating mass of 10 to 90 $g/m^2$.

CITATION LIST

Patent Literature

PTL 1: British Patent No. 1490535
PTL 2: Japanese Patent No. 3663145
PTL 3: Japanese Patent No. 4883240

SUMMARY OF THE INVENTION

However, a galvanized steel sheet or a zinc aluminum coated steel sheet having a coating layer of low melting point is used in hot press-formed parts manufactured by the method described in Patent Literature 2. This can cause liquid-metal brittle fracture during hot press-forming, in which zinc in the coating layer enters the steel sheet and causes cracks.

In recent years, there has been a strong demand for improving productivity due to a reduction in hot press-forming tact time. Thus, in various steps of hot press-forming, studies have been made to quickly transfer a heated steel sheet to a press-forming machine and immediately hot press-form the steel sheet, that is, to decrease a transfer time. However, when the steel sheet for hot press-forming described in Patent Literature 3 is subjected to hot press-forming after a short transfer time, liquid-metal brittle fracture can be caused. Thus, in order to prevent the fracture, the start of hot press-forming is intentionally delayed. This deteriorates productivity.

In view of the situations described above, aspects of the present invention provide a steel sheet for hot press-forming having excellent liquid-metal brittle resistance that ensures no liquid-metal brittle fracture even under hot press-forming conditions including a short transfer time so as to improve productivity.

The present inventors extensively studied steel sheets for hot press-forming in order to solve the problems described above. As a result, the present inventors found that in order to attain the advantages associated with aspects of the present invention the following steel sheet for hot press-forming is effective and preferable. That is, the steel sheet for hot press-forming has two coating layers on its surface. The first coating layer having a high melting point contains 60% or more by mass Ni and a remainder composed of Zn and incidental impurities, a coating mass thereof being more than 5 $g/m^2$ and 50 $g/m^2$ or less. The second coating layer on the first coating layer contains 10% to 25% by mass Ni and a remainder composed of Zn and incidental impurities, a coating mass thereof being 10 to 90 $g/m^2$.

Aspects of the present invention are based on such findings and provides a steel sheet for hot press-forming, characterized by having;
the first coating layer on the surface of the steel sheet, containing 60% or more by mass Ni and a remainder composed of Zn and incidental impurities, a coating mass thereof being more than 5 $g/m^2$ and 50 $g/m^2$ or less per side, and the second coating layer on the first coating layer, containing 10% to 25% by mass Ni and a remainder composed of Zn and incidental impurities, a coating mass thereof being 10 to 90 $g/m^2$ per side.

A steel sheet for hot press-forming according to aspects of the present invention can be used to manufacture hot press-formed parts having excellent liquid-metal brittle resistance that ensures no liquid-metal brittle fracture even under hot press-forming conditions including a short transfer time so as to improve productivity. Hot press-formed parts manufactured from the steel sheet for hot press-forming according to aspects of the present invention have excellent liquid-metal brittle resistance and are suitable for automotive underbody parts and automotive body structural parts.

BRIEF DESCRIPTION OF THE DRAWINGS

FIG. 1 is a drawing of hat-shaped part manufactured by hot press-forming a steel sheet in Example 1.

DETAILED DESCRIPTION OF EXEMPLARY EMBODIMENTS OF THE INVENTION

1) Coating Layer

One aspects of the present invention is characterized by having the first coating layer on the surface of the steel sheet containing 60% or more by mass Ni and a remainder composed of Zn and incidental impurities, a coating weight of more than 5 g/m$^2$ and 50 g/m$^2$ or less per side, and the second coating layer on the first coating layer, containing 10% to 25% by mass Ni and a remainder composed of Zn and incidental impurities, a coating mass thereof being 10 to 90 g/m$^2$ per side, in order to ensure excellent liquid-metal brittle resistance even under hot press-forming conditions including a short transfer time so as to improve productivity.

A short transfer time results in a high initial temperature of hot press-forming. Thus, the hot press-forming may be started before the coating layer is completely solidified. This sometimes causes liquid-metal brittle fracture. In accordance with aspects of the present invention, the first coating layer on the surface of the steel sheet can completely prevent zinc in the second coating layer described below from entering the steel sheet. The first coating layer contains 60% or more by mass Ni and a remainder composed of Zn and incidental impurities, a coating mass thereof being more than 5 g/m$^2$ and 50 g/m$^2$ or less per side. This can ensure excellent liquid-metal brittle resistance even under hot press-forming conditions including a short transfer time.

The reason that the Ni content of the first coating layer is 60% or more by mass is that the first coating layer can have a very high melting point of 1000° C. or more so as not to melt during heating before hot press-forming.

The first coating layer has a coating mass of more than 5 g/m$^2$ and 50 g/m$^2$ or less per side. The first coating layer with a coating mass of 5 g/m$^2$ or less has no shielding effect so as to prevent zinc in the second coating layer from entering the steel sheet. The shielding effect levels off at a coating mass of 50 g/m$^2$, and the coating mass of more than 50 g/m$^2$ results in increased costs. Thus, the first coating layer has a coating mass of more than 5 g/m$^2$ and 50 g/m$^2$ or less.

In accordance with aspects of the present invention, the second coating layer is disposed on the first coating layer. The second coating layer contains 10% to 25% by mass Ni and a remainder composed of Zn and incidental impurities and has a coating mass of 10 to 90 g/m$^2$ per side.

The reason that the Ni content of the second coating layer ranges from 10% to 25% by mass is that the phase structure of the second coating layer can be a corrosion resistant γ phase having a melting point of 881° C. When the coating layer has Ni content in the range of 10% to 25% by mass, the γ phase having a crystal structure of $Ni_2Zn_{11}$, $NiZn_3$, or $Ni_5Zn_{21}$ and a melting point of 881° C. is formed, thereby minimizing ZnO formation reaction during heating. After hot press-forming, the coating layer remains as the γ phase and has high corrosion resistance due to the sacrificial protection effect of Zn. The formation of the γ phase at Ni content in the range of 10% to 25% by mass does not necessarily conform to the equilibrium diagram of Ni—Zn alloy. This is probably because the coating layer formation reaction by an electroplating method or the like proceeds in a non-equilibrium manner. The γ phase has a crystal structure of $Ni_2Zn_{11}$, $NiZn_3$, or $Ni_5Zn_{21}$ and can be identified by an X-ray diffraction method or an electron diffraction method utilizing a transmission electron microscope (TEM).

In accordance with aspects of the present invention, the second coating layer has a coating mass of 10 to 90 g/m$^2$ per side. The coating mass of less than 10 g/m$^2$ results in hot press-formed parts having insufficient corrosion resistance. The coating mass of more than 90 g/m$^2$ results in increased costs. Thus, the second coating layer should be at a coating mass of 10 to 90 g/m$^2$.

The coating weight of coating layer can be determined by a wet analysis method. More specifically, for example, a coating layer having a known deposition area is dissolved in 6% by mass aqueous hydrochloric acid to which 1 g/l of hexamethylenetetramine is added as an inhibitor, and the coating weight of coating layer can be determined from the weight loss.

A method for forming such a coating layer is preferably, but not limited to, a known electroplating method. The coating weight of coating layer can be controlled by adjusting the energization time.

2) Base Steel Sheet

In order to manufacture hot press-formed parts having a tensile strength of 980 MPa or more, the base steel sheet may be a hot-rolled steel sheet or a cold-rolled steel sheet having a composition consisting of C: 0.15% to 0.50%, Si: 0.05% to 2.00%, Mn: 0.5% to 3.0%, P: 0.10% or less, S: 0.05% or less, Al: 0.10% or less, N: 0.010% or less on a mass percent basis, and the remainder being Fe and incidental impurities. The reasons for limiting the content of each element will be described below. Unless otherwise specified, "%" of the component content refers to "% by mass".

C: 0.15 to 0.50%

C is an element for improving strength of steel. In order for hot press-formed parts to have a tensile strength (TS) of 980 MPa or more, the C content should be 0.15% or more. On the other hand, the C content of more than 0.50% results in very low blanking formability of the base steel sheet. Thus, the C content ranges from 0.15% to 0.50%.

Si: 0.05% to 2.00%

Like C, Si is an element for improving strength of steel. In order for hot press-formed parts to have a TS of 980 MPa or more, the Si content should be 0.05% or more. On the other hand, the Si content of more than 2.00% results in significantly increased surface defects called red scales during hot-rolling, increased hot-rolling load, and low ductility of hot-rolled steel sheets. Furthermore, the Si content of more than 2.00% may adversely affect plating treatability in plating treatment of forming a coating layer composed mainly of Zn or Al on the surface of the base steel sheet. Thus, the Si content ranges from 0.05% to 2.00%.

Mn: 0.5% to 3.0%

Mn is an element effective in suppressing ferrite transformation and improving hardenability. Mn decreases the $Ac_3$ transformation point and is therefore an element effective in decreasing the heating temperature before hot press-forming. These effects require a Mn content of 0.5% or more. On the other hand, the Mn content of more than 3.0% results in a lack of characteristic uniformity of the base steel sheet and hot press-formed parts due to its segregation. Thus, the Mn content ranges from 0.5% to 3.0%.

P: 0.10% or Less

The P content of more than 0.10% results in a lack of characteristic uniformity and a significant decrease in toughness of the base steel sheet and hot press-formed parts due to its segregation. Thus, the P content is 0.10% or less.

S: 0.05% or Less

The S content of more than 0.05% results in a decrease in toughness of hot press-formed parts. Thus, the S content is 0.05% or less.

Al: 0.10% or Less

The Al content of more than 0.10% results in low blanking formability or low hardenability of the base steel sheet. Thus, the Al content is 0.10% or less.

N: 0.010% or Less

The N content of more than 0.010% results in formation of nitrides AlN during hot-rolling or during heating before hot press-forming, thus resulting in low blanking formability or low hardenability of the base steel sheet. Thus, the N content is 0.010% or less.

The remainder is Fe and incidental impurities. For the following reasons, at least one selected from Cr: 0.01% to 1.0%, Ti: 0.20% or less, and B: 0.0005% to 0.0800%, and/or Sb: 0.003% to 0.030% is preferably individually or simultaneously contained.

Cr: 0.01% to 1.0%

Cr is an element effective in improving strength and hardenability of steel. The effect preferably requires a Cr content of 0.01% or more. On the other hand, the Cr content of more than 1.0% results in significantly increased costs. Thus, the upper limit of the Cr content is preferably 1.0%.

Ti: 0.20% or Less

Ti is an element effective in improving strength and toughness of steel due to a decrease in grain size. Ti is also an element that forms nitrides in preference to B described below and is effective in improving hardenability due to solute B. However, the Ti content of more than 0.20% results in extremely increased hot-rolling load and low toughness of hot press-formed parts. Thus, the upper limit of the Ti content is preferably 0.20%.

B: 0.0005% to 0.0800%

B is an element effective in improving hardenability and toughness after hot press-forming. The effect preferably requires a B content of 0.0005% or more. On the other hand, the B content of more than 0.0800% results in extremely increased hot-rolling load and a fracture of hot-rolled steel sheet due to the formation of martensite phase or bainite phase. Thus, the upper limit of the B content is preferably 0.0800%.

Sb: 0.003% to 0.030%

Sb has an effect of suppressing the formation of decarburized layer in a steel sheet surface layer in a hot press-forming process from heating before hot press-forming to cooling of the steel sheet. The effect requires a Sb content of 0.003% or more. On the other hand, the Sb content of more than 0.030% results in increased rolling load and low productivity. Thus, the Sb content preferably ranges from 0.003% to 0.030%.

3) Method for Manufacturing Hot Press-Formed Parts

The steel sheet for hot press-forming according to aspects of the present invention can be hot press-formed using common procedures to manufacture hot press-formed parts. For example, the steel sheet for hot press-forming is heated to a temperature in the range of 850° C. to 950° C., which is higher than or equal to the $Ac_3$ transformation point, and then subjected to hot press-forming. As a method for heating the steel sheet before hot press-forming, heating with an electric furnace or a gas furnace, flame heating, electrical resistance heating, high-frequency heating, induction heating, or far-infrared heating may be applied.

The steel sheet for hot press-forming thus heated is placed in a mold composed of a die and a punch, subjected to hot press-forming, and cooled under desired cooling conditions, thus manufacturing hot press-formed parts.

EXAMPLE 1

A cold-rolled steel sheet having a thickness of 1.6 mm was used as a base steel sheet. The cold-rolled steel sheet had a composition consisting of C: 0.23%, Si: 0.25%, Mn: 1.2%, P: 0.01%, S: 0.01%, Al: 0.03%, N: 0.005%, Cr: 0.2%, Ti: 0.02%, B: 0.0022%, Sb: 0.008% on a mass percent basis, and the remainder being Fe and incidental impurities, and had an $Ac_3$ transformation point of 820° C. The first coating layer and the second coating layer were formed in this order on both sides of the cold-rolled steel sheet by electroplating. Thus, steel sheets Nos. 1 to 16 were manufactured.

The first coating layer was formed in a plating bath containing 240 g/L nickel sulfate hexahydrate and 30 g/L boric acid at a pH of 3.6, at a bath temperature of 50° C., and at a current density of 5 A/dm$^2$. The coating weight of coating layer was adjusted by changing the energization time. For the steel sheets Nos. 2 and 11, the Ni content was adjusted by the addition of zinc sulfate heptahydrate. The second coating layer was formed in a plating bath containing 200 g/L nickel sulfate hexahydrate and 10 to 100 g/L zinc sulfate heptahydrate at a pH of 1.5, at a bath temperature of 50° C., and at a current density in the range of 5 to 100 A/dm$^2$. The Ni content was adjusted by changing the amount of zinc sulfate heptahydrate and the current density. The coating weight of coating layer was adjusted by changing the energization time.

100 mm×200 mm test specimens were taken from the steel sheets Nos. 1 to 16 thus manufactured. The steel sheets were heated to the heating temperature listed in Table 1 in an electric furnace. Hot press-forming was then performed at an initial forming temperature listed in Table 1. A hat-shaped mold composed of a punch having a shoulder R 6 mm in radius and a die having a shoulder R 6 mm in radius was used in the hot press-forming. A hat-shaped part having a height of 40 mm illustrated in FIG. 1 was manufactured by hat-shaped forming at a blank holding pressure of 20 ton and at a speed of 200 mm/s.

In general hot press-forming, the cooling rate of steel sheet in a transfer step from heating to press-forming is approximately 20° C./s. For example, when a steel sheet heated to 900° C. is transferred to a pressing machine at a transfer time of approximately 10 seconds, the initial forming temperature is approximately 700° C. In the present example, the transfer time was controlled from 4 to 6 seconds, which is shorter than the general transfer time, and the initial forming temperature was as high as 820° C. or more.

Hat-shaped parts thus manufactured were evaluated for liquid-metal brittle resistance by the following method.

Liquid-metal brittle resistance: A sample for cross-sectional observation was taken from the shoulder R (an outer surface side) of hat-shaped part, and observed with a scanning electron microscope (SEM). The maximum crack depth observed in the base steel sheet was evaluated as follows.

Circle (○): Maximum crack depth=0 mm (no cracks)

Cross (X): Maximum crack depth ≥0.01 mm (cracks occurred)

Table 1 lists the details of the coating layers, the hot press-forming conditions, and the liquid-metal brittle resistance evaluation results of the steel sheets Nos. 1 to 16.

TABLE 1

| Steel sheet No. | First coating layer Ni content (mass %) | First coating layer Coating mass* (g/m2) | Second coating layer Ni content (mass %) | Second coating layer Coating mass* (g/m2) | Hot press-forming conditions Heating temperature (° C.) | Hot press-forming conditions Initial forming temperature (° C.) | Liquid-metal brittle resistance Maximum crack depth (mm) | Evaluation | Remarks |
|---|---|---|---|---|---|---|---|---|---|
| 1 | 100 | 10 | 12 | 50 | 900 | 820 | 0 | ○ | Invention Example |
| 2 | 60 | 10 | 12 | 50 | 900 | 820 | 0 | ○ | Invention Example |
| 3 | 100 | 6 | 12 | 50 | 900 | 820 | 0 | ○ | Invention Example |
| 4 | 100 | 50 | 12 | 50 | 900 | 820 | 0 | ○ | Invention Example |
| 5 | 100 | 10 | 10 | 50 | 900 | 820 | 0 | ○ | Invention Example |
| 6 | 100 | 10 | 25 | 50 | 900 | 820 | 0 | ○ | Invention Example |
| 7 | 100 | 10 | 12 | 10 | 900 | 820 | 0 | ○ | Invention Example |
| 8 | 100 | 10 | 12 | 90 | 900 | 820 | 0 | ○ | Invention Example |
| 9 | 100 | 10 | 12 | 50 | 950 | 860 | 0 | ○ | Invention Example |
| 10 | 100 | 10 | 12 | 50 | 1000 | 890 | 0 | ○ | Invention Example |
| 11 | 50 | 10 | 12 | 50 | 900 | 820 | 0.1 | x | Comparative example |
| 12 | 100 | 0.1 | 12 | 50 | 900 | 820 | 0.15 | x | Comparative example |
| 13 | 100 | 1 | 12 | 50 | 900 | 820 | 0.1 | x | Comparative example |
| 14 | 100 | 4 | 12 | 50 | 900 | 820 | 0.05 | x | Comparative example |
| 15 | 100 | 4 | 12 | 50 | 950 | 860 | 0.2 | x | Comparative example |
| 16 | 100 | 4 | 12 | 50 | 1000 | 890 | 0.3 | x | Comparative example |

*per side

The steel sheets for hot press-forming Nos. 1 to 10 according to aspects of the present invention have excellent liquid-metal brittle resistance even under the hot press-forming conditions including a high initial forming temperature, that is, under the hot press-forming conditions including a short transfer time.

All of the hat-shaped parts manufactured using the steel sheets Nos. 1 to 10 according to aspects of the present invention and the steel sheets Nos. 11 to 16 according to the comparative examples had a tensile strength of 980 MPa or more.

The invention claimed is:
1. A steel sheet for hot press-forming comprising:
   a first coating layer on a surface of the steel sheet, consisting of 60% or more by mass Ni and a remainder composed of Zn and incidental impurities, a coating mass thereof being 6 g/m² or more and 50 g/m² or less per side; and
   a second coating layer on the first coating layer, containing 10% to 25% by mass Ni and a remainder composed of Zn and incidental impurities, a coating mass thereof being 10 to 90 g/m² per side, the second coating layer being an outermost coating layer.

* * * * *